United States Patent
Shin et al.

(10) Patent No.: US 12,423,520 B2
(45) Date of Patent: Sep. 23, 2025

(54) METHOD OF TRAINING LANGUAGE MODEL FOR CYBERSECURITY AND SYSTEM PERFORMING THE SAME

(71) Applicants: S2W INC., Seongnam-si (KR); KOREA ADVANCED INSTITUTE OF SCIENCE AND TECHNOLOGY, Daejeon (KR)

(72) Inventors: Seung Won Shin, Daejeon (KR); Young Jin Jin, Daejeon (KR); Eu Gene Jang, Seongnam-si (KR); Da Yeon Yim, Seoul (KR); Jin Woo Chung, Seongnam-si (KR); Yong Jae Lee, Seongnam-si (KR); Jian Cui, Bloomington, IN (US); Chang Hoon Yoon, Seongnam-si (KR); Seung Yong Yang, Seoul (KR)

(73) Assignees: S2W INC., Seongnam-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 18/973,338

(22) Filed: Dec. 9, 2024

(65) Prior Publication Data
US 2025/0190698 A1 Jun. 12, 2025

(30) Foreign Application Priority Data
Dec. 8, 2023 (KR) .................. 10-2023-0177674

(51) Int. Cl.
*G06F 40/211* (2020.01)
*G06F 40/284* (2020.01)

(52) U.S. Cl.
CPC .......... *G06F 40/211* (2020.01); *G06F 40/284* (2020.01)

(58) Field of Classification Search
CPC ............................ G06F 40/211; G06F 40/284
See application file for complete search history.

(56) References Cited

U.S. PATENT DOCUMENTS 10,445,432 B1 * 10/2019 Reiter ................... G06F 40/268
11,275,900 B2 * 3/2022 Patil ...................... G06F 16/951
(Continued)

FOREIGN PATENT DOCUMENTS

| KR | 10-2021-0070768 A | 6/2021 |
| KR | 10-2022-0121349 A | 9/2022 |
| KR | 10-2023-0149040 A | 10/2023 |

OTHER PUBLICATIONS

Jin, Youngjin, et al. "DarkBERT: A language model for the dark side of the Internet." arXiv preprint arXiv:2305.08596 (2023). (Year: 2023).*
(Continued)

*Primary Examiner* — Douglas Godbold
(74) *Attorney, Agent, or Firm* — Sughrue Mion, PLLC (57) ABSTRACT

Provided is a system for training a language model for cybersecurity, which includes: a document collection unit that collects a cybersecurity document used for training a language model for cybersecurity; an extraction unit that identifies non-linguistic elements in the cybersecurity document based on a non-linguistic element database; a tokenization unit that tokenizes the cybersecurity document to generate a plurality of tokens; and a language model application unit that controls the language model to simultaneously perform a first task of classifying types of the non-linguistic elements including at least one of a Bitcoin address, a hash value, an IP address, and a vulnerability identifier included in the cybersecurity document and a second task of recovering only linguistic elements of the cybersecurity document.

4 Claims, 8 Drawing Sheets

(56) References Cited

U.S. PATENT DOCUMENTS

| | | | |
|---|---|---|---|
| 11,687,717 B2* | 6/2023 | Jones | G06F 40/30 |
| | | | 704/9 |
| 2012/0290288 A1* | 11/2012 | Ait-Mokhtar | G06F 40/211 |
| | | | 704/9 |
| 2018/0218731 A1* | 8/2018 | Gustafson | G10L 15/22 |
| 2019/0057146 A1* | 2/2019 | Jaroch | G06F 16/335 |
| 2021/0216642 A1* | 7/2021 | Barraza Enciso | G06F 21/577 |
| 2024/0273292 A1* | 8/2024 | Lakshmin | G06F 40/284 |

OTHER PUBLICATIONS

Aghaei, Ehsan, et al. "Securebert: A domain-specific language model for cybersecurity." International Conference on Security and Privacy in Communication Systems. Cham: Springer Nature Switzerland, 2022. (Year: 2022).*

Jang, Eugene, et al. "Ignore Me But Don't Replace Me: Utilizing Non-Linguistic Elements for Pretraining on the Cybersecurity Domain." arXiv preprint arXiv:2403.10576 (2024). (Year: 2024).*

Husari, Ghaith, et al. "Ttpdrill: Automatic and accurate extraction of threat actions from unstructured text of cti sources." Proceedings of the 33rd annual computer security applications conference. 2017. (Year: 2017).*

Ameri, Kimia, et al. "Cybert: Cybersecurity claim classification by fine-tuning the bert language model." Journal of Cybersecurity and Privacy 1.4 (2021): 615-637. (Year: 2021).*

Zhou, Shieheng, et al. "Named entity recognition using BERT with whole world masking in cybersecurity domain." 2021 IEEE 6th international conference on big data analytics (ICBDA). IEEE, 2021. (Year: 2021).*

Korean Office Action Decision to Grant for Korean Patent Application No. 10-2023-0177674 dated Sep. 30, 2024.

Korean Office Action for Korean Patent Application No. 10-2023-0177674 dated Mar. 6, 2024.

* cited by examiner

METHOD OF TRAINING LANGUAGE MODEL FOR CYBERSECURITY AND SYSTEM PERFORMING THE SAME

CROSS-REFERENCE TO RELATED APPLICATION

This application claims priority to and the benefit of Korean Patent Application No. 2023-0177674, filed on Dec. 8, 2023, the disclosure of which is incorporated herein by reference in its entirety.

BACKGROUND

1. Field of the Disclosure

The present disclosure relates to a method of training a language model for cybersecurity and a system for performing the same, and more specifically, to a method of training a language model for cybersecurity and a system for performing the same that are capable of allowing a language model to learn cybersecurity documents based on linguistic content and classify non-linguistic elements, to thereby improve learning efficiency.

2. Discussion of Related Art

Language models are trained by applying self-supervised learning to corpora. In this case, there are various methods of self-supervised learning, but it mainly involves tasks such as recovering the original content from a modified form of given text (e.g., deleting or converting words in the original text).

Meanwhile, cybersecurity documents have great amounts of non-linguistic elements compared to other documents. Non-linguistic elements are composed of complex, arbitrary, and meaningless strings, lacking linguistic meaning. Therefore, applying self-supervised learning to non-linguistic elements may have a negative effect on the performance of the language model.

On the other hand, non-linguistic elements of cybersecurity documents may include elements from which meaning is extractable. Since these elements are frequent and potentially important, it is required to determine whether to apply the elements to the training of language models.

SUMMARY OF THE DISCLOSURE

The present disclosure is directed to providing a method of training a language model for cybersecurity and a system for performing the same that are capable of improving the efficiency of training a language model by allowing cybersecurity documents to be learned based on linguistic content.

The present disclosure is also directed to providing a method of training a language model for cybersecurity and a system for performing the same that are capable of effectively processing cybersecurity documents by training a language model to classify types of non-linguistic elements of cybersecurity documents.

Objects of the present disclosure are not limited to that described above, and other objects which have not been described will be clearly understood by those skilled in the technical field to which the present disclosure pertains from this specification and the accompanying drawings.

According to an aspect of the present disclosure, there is provided a system for training a language model for cybersecurity, which includes: a document collection unit that collects a cybersecurity document used for training a language model for cybersecurity; an extraction unit that identifies non-linguistic elements in the cybersecurity document based on a non-linguistic element database; a tokenization unit that tokenizes the cybersecurity document to generate a plurality of tokens; and a language model application unit that controls the language model to simultaneously perform a first task of classifying types of the non-linguistic elements including at least one of a Bitcoin address, a hash value, an IP address, and a vulnerability identifier included in the cybersecurity document and a second task of recovering only linguistic elements of the cybersecurity document.

According to another aspect of the present disclosure, there is provided a method of training a language model for cybersecurity, which is performed by the system for training a language model for cybersecurity, the method including: identifying non-linguistic elements in the document based on a non-linguistic element database; tokenizing the cybersecurity document to generate a plurality of tokens; and controlling the language model to simultaneously perform a first task of classifying types of the non-linguistic elements including at least one of a Bitcoin address, a hash value, an IP address, and a vulnerability identifier included in the cybersecurity document and a second task of recovering only linguistic elements of the cybersecurity document.

Solutions of the present disclosure are not limited to those described above, and other solutions which have not been described will be clearly understood by those skilled in the technical field to which the present disclosure pertains from this specification and the accompanying drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings.

DETAILED DESCRIPTION OF EXEMPLARY EMBODIMENTS

The above objects, features and advantages of the present disclosure will be described in detail with reference to the accompanying drawings to enable those skilled in the art to easily practice the present disclosure. In the drawings, parts irrelevant to the description may be omitted for the clarity of explanation, and like numbers refer to like elements throughout the description of the drawings.

Self-supervised learning of a language model is a technique in which a model learns on its own from given data. The method may be used to pre-train a model, especially by utilizing large-scale data without labels. Self-supervised learning is a method for improving a model's comprehension ability by utilizing information or patterns inherent in a corpus and may be performed mainly through tasks such as recovering the original text from a modified state of given text.

More specifically, self-supervised learning may be performed to help the model understand the context, grammar, and meaning within the data. For example, a masked language model (MLM) involves masking specific words within text, and allowing a model to predict the masked words based on the surrounding context. As another example, next sentence prediction (NSP) involves, with two given sentences, allowing a model to predict the probability that the second sentence will follow the first sentence, which may help in understanding the context. Furthermore, in the language modeling task, the model learns to predict a word at a specific position such that the next word is predicted based on the previous word, thereby understanding the context.

Afterward, the language model may generate unlabeled data based on a set self-supervised learning task. For example, in the case of a masked language model, collected documents are tokenized and some of the tokens are masked, after which the model may be trained to predict the words of the masked tokens.

TABLE 1

Original text: The Dropper drops a zipped SysJoker(53f1bb23f670d331c9041748e7e8e396)
Problem: The Dropper [MASK] a zipped SysJoker (53f1bb23f670d331c9041748e7e8e396)

For example, in Table 1 above, when the original text is "The Dropper drops a zipped SysJoker (53f1bb23f670d331c9041748e7e8e396)," and the problem is "The Dropper [MASK] a zipped SysJoker (53f1bb23f670d331c9041748e7e8e396)," the MLM learns that the word "drops" will appear in the part [MASK] based on the surrounding context.

However, cybersecurity documents are characterized by containing more non-linguistic elements than other documents. Non-linguistic elements may include information that is not related to language, i.e., information that is irrelevant to the structure of context, the grammar, and the meaning, and information that is not fit the learning purpose of the model.

Since non-linguistic elements include a large number of complex, arbitrary, and meaningless strings, self-supervised learning applied to this part is ineffective. When self-supervised learning is performed without considering the non-linguistic parts, it may have a negative effect on language model training.

TABLE 2

Original text: The Dropper drops a zipped SysJoker(53f1bb23f670d331c9041748e7e8e396)
Problem: The Dropper a zipped SysJoker (53f1bb23f670[MASK]31c9041748e7e8e396)

For example, in Table 2 above, the part "53f1bb23f670d331c9041748e7e8e396" being an Message Digest 5 (MD5) hash value is an arbitrary string, and linguistic meaning may not be obtained when it is read. Therefore, even when [MASK] is included in an MD5 string in the training of the masked language model, there is no linguistic reason for "d3" to be included.

Meanwhile, non-linguistic elements of cybersecurity documents may include elements from which meaning may be extracted. Since such elements may frequently appear and may be important, simply excluding the elements from the training of the language model may be inappropriate. Therefore, according to the embodiment of the present disclosure, non-linguistic elements in cybersecurity documents may be classified into completely non-linguistic elements that are arbitrary strings and have no linguistic meaning at all, and paralinguistic elements from which linguistic content may be inferred.

TABLE 3

Example: The Dropper drops a zipped SysJoker (53f1bb23f670d331c9041748e7e8e396) from C2 https[://]github[.]url-mini[.] com/msg.zip, copies it to...

In Table 3 above, "53f1bb23f670d331c9041748e7e8e396" is a non-linguistic element referred to as an MD5 hash value. The part "53f1bb23f670d331c9041748e7e8e396" is an arbitrary string that does not provide a linguistic meaning in the document. On the other hand, in Table 3 above, "https [://] github [.] url-mini [.] com/msg.zip" is a non-linguistic element referred to as a URL, but contains linguistic content that may be inferred to mean that the URL is impersonating a website Github and inducing the download of a file referred to as msg.zip. Completely excluding the elements from the training of the language model may not help the language model understand the entire context of the cybersecurity document.

Hereinafter, a process of training a language model for cybersecurity according to an embodiment of the present disclosure will be described with reference to FIGS. 1A to 7.

Figure 1A:
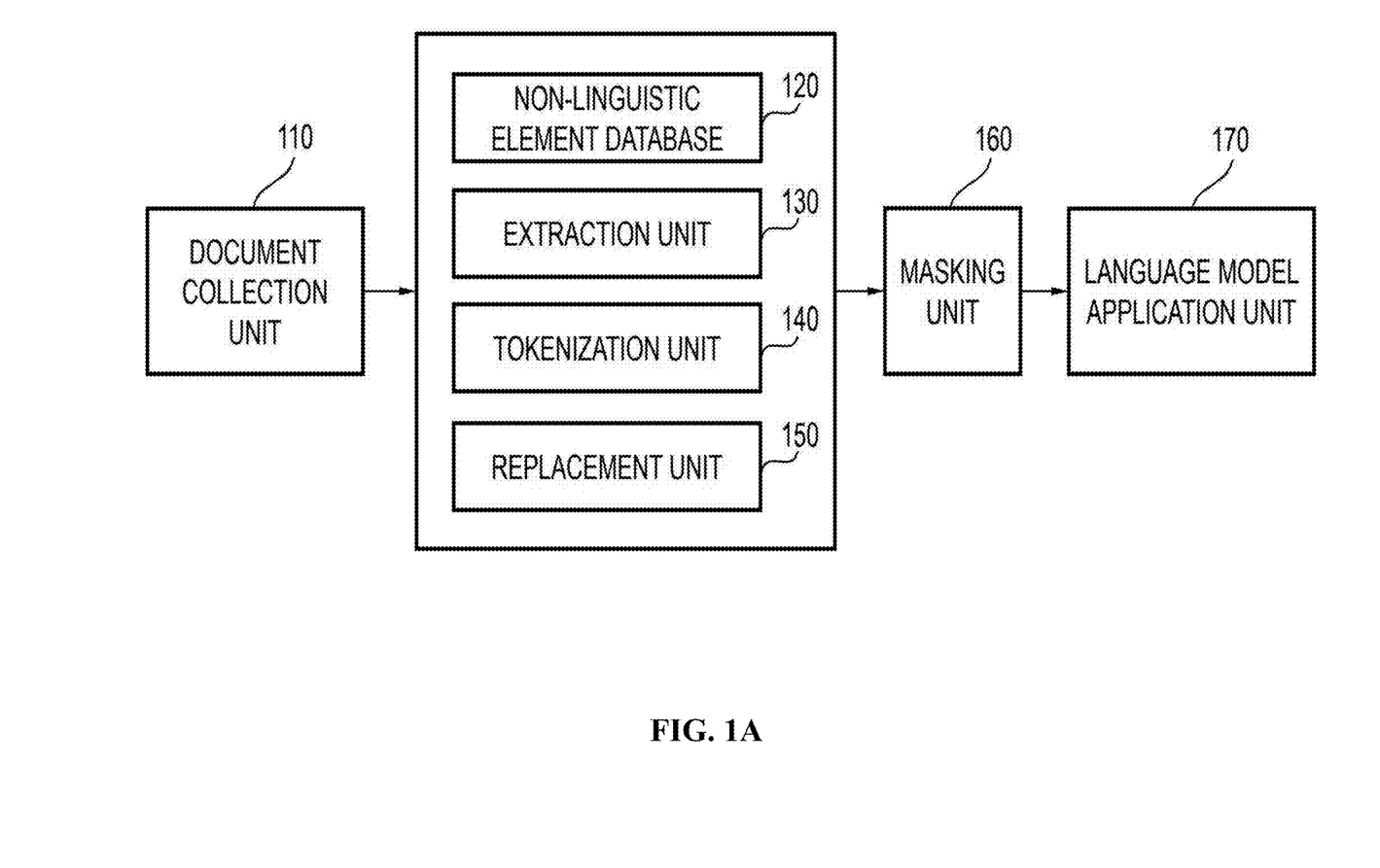
FIG. 1A is diagrams for describing a system for training a language model for cybersecurity according to an embodiment of the present disclosure.

FIG. 1a is a block diagram for describing a system for training a language model for cybersecurity according to an embodiment of the present disclosure.

Referring to FIG. 1A, a system for training a language model for cybersecurity according to an embodiment of the present disclosure includes a document collection unit 110, an extraction unit 130, a tokenization unit 140, a replacement unit 150, a masking unit 160, a language model application unit 170, and a non-linguistic element database 120.

The document collection unit 110 may collect documents used for training a language model for cybersecurity. The documents may appropriately be documents related to cybersecurity. A plurality of strings constituting the documents may include linguistic elements and non-linguistic elements.

Non-linguistic elements that appear in the cybersecurity documents may include Bitcoin addresses having 26 to 35 characters, different types of hashes (e.g., a SHA hash value of a 64-character file, an MD5 hash value of a 32-character file), IP addresses, vulnerability identifiers, and the like. For example, "53f1bb23f670d331c9041748e7e8e396" is an arbitrary string referred to as an MD5 hash value, is a character string with no linguistic meaning, and may be classified as a non-linguistic element.

Further, other non-linguistic elements appearing in the cybersecurity documents may include website addresses, email addresses, and the like. URLs, email addresses, and the like may be distinguished from non-linguistic elements, such as hash values. URLs and email addresses may be composed of arbitrary strings, but through the strings, whether a malicious user is impersonating a specific website or inducing the download of a malicious specific file may be identified. In the present disclosure, URLs and email addresses are defined as paralinguistic elements. Paralinguistic elements may be distinguished from completely non-linguistic elements but are included among non-linguistic elements.

The non-linguistic element database 120 may include data on non-linguistic elements appearing in cybersecurity documents and identification code data that classify the types of the elements.

For example, in the string "The Dropper drops a zipped SysJoker (53f1bb23f670d331c9041748e7e8e396) from C2 https [://] github [.] url-mini [.] com/msg.zip, copies it to," "53f1bb23f670d331c9041748e7e8e396" is as a first non-linguistic element, that is, a completely non-linguistic element, is classified among MD5 Hashes, and may be stored in the non-linguistic element database 120 together with an MD5 identification code.

As another example, "https [://] github [.] url-mini [.] com/msg.zip" is a second non-linguistic element, that is, a paralinguistic element among non-linguistic elements, is classified as a URL, and may be stored in the non-linguistic element database 120 together with a URL identification code.

The extraction unit 130 may perform a function of extracting a string corresponding to a non-linguistic element, i.e., a first non-linguistic element and/or a second non-linguistic element, from among a plurality of character strings constituting documents collected by the document collection unit 110 and recording the string in the non-linguistic element database 120. Furthermore, the extraction unit 130 may extract the non-linguistic element from the documents and mark a token corresponding to the non-linguistic element among tokens generated by the tokenization unit 140.

The tokenization unit 140 divides the text of the cybersecurity document into small units and tokenizes the small units of text. The tokens may be divided based on sentences, words, or other linguistically meaningful parts in order to properly supply the text data to the language model. The tokenization unit 140 may generate tokens for the text sequence and mark tokens corresponding to non-linguistic elements through the extraction unit 130.

The replacement unit 150 may perform the function of replacing non-linguistic elements in the cybersecurity document with an arbitrary string. In this case, the string may be varied according to a non-linguistic identification code corresponding to a non-linguistic element. In this case, the tokenization unit 140 may tokenize a document in which non-linguistic elements are replaced with strings.

The replacement unit 150 according to an embodiment of the present disclosure may replace only completely non-linguistic elements among non-linguistic elements included in a cybersecurity document with an identification code. For example, when the text sequence of the cybersecurity document is "The Dropper drops a zipped SysJoker (53f1bb23f670d331c9041748e7e8e396)," "53f1bb23f670d331c9041748e7e8e396" is an MD5 hash value and corresponds to a completely non-linguistic element. The replacement unit 150 may replace "53f1bb23f670d331c9041748e7e8e396" with a preset identification code. In this case, the replacement unit 150 may not replace paralinguistic elements, such as URLs.

The replacement unit 150 according to another embodiment of the present disclosure may replace all non-linguistic elements, including paralinguistic elements, among the non-linguistic elements included in the cybersecurity document with identification codes. For example, when the text sequence of the cybersecurity document is "Get the sample from the website <www.google.com>. Then the sample will be processed," "www.google.com" is a URL, which is a non-linguistic element but corresponds to a paralinguistic element that is distinguished from a completely non-linguistic element, such as an MD5 hash value. According to the present embodiment, the replacement unit 150 may replace not only completely non-linguistic elements but also paralinguistic elements with a preset identification code. That is, in the above example, "www.google.com" may be replaced.

Alternatively, according to embodiments, the replacement unit 150 may not function. That is, the replacement unit 150 may not perform separate processing on the non-linguistic elements of the cybersecurity document.

The masking unit 160 randomly masks tokens. The masked tokens become the targets that the model needs to predict. This is to help the model understand the context and perform predictions.

The masking unit 160 according to an embodiment of the present disclosure may perform masking only on tokens corresponding to linguistic elements at a specific ratio. In other words, the masking unit 160 may mask tokens excluding tokens corresponding to non-linguistic elements.

The masking unit 160 according to another embodiment of the present disclosure may allow tokens corresponding to paralinguistic elements among non-linguistic elements to be included in the masking process. In other words, the masking unit 160 may mask tokens corresponding to linguistic elements and paralinguistic elements excluding tokens corresponding to completely non-linguistic elements.

The language model application unit 170 may provide tokens for the text sequence containing masked tokens as input to a universal pre-training language model.

Then, a model may be trained to predict tokens at masked positions while classifying the types of the tokens. That is, according to an embodiment of the present disclosure, a training target model may be trained to simultaneously perform two tasks: first, predicting the original token for one input, and second, predicting the type of the token.

More specifically, the masking unit 160 according to an embodiment of the present disclosure may mask only tokens corresponding to linguistic elements, excluding non-linguistic elements, so that the training target language model may be trained to recover only linguistic elements of the document. That is, in the system according to an embodiment of the present disclosure, since the language model learns only the sequence in which non-linguistic elements have been excluded from the cybersecurity document, the performance of identifying the interaction and/or semantic similarity of linguistic elements included in the cybersecurity document may be improved. Furthermore, compared to the case in which the entire sequence including non-linguistic elements is learned, the performance of understanding the context of the cybersecurity document and/or the performance of identifying the correlation between the cybersecurity documents and core content may be improved.

Furthermore, a language model according to an embodiment of the present disclosure may be trained to classify the types of tokens for an input text sequence.

According to an embodiment of the present disclosure, a training target language model may predict the types of tokens by referring to data on non-linguistic elements and identification code data that classify the types of the elements in the non-linguistic element database 120. That is, in a system according to an embodiment of the present disclosure, a language model may be trained to classify the types of non-linguistic elements in a cybersecurity document.

Although not shown in the drawings, the system according to an embodiment of the present disclosure, may include a transceiver, a memory, and a processor.

The transceiver may communicate with an arbitrary external device or an external server. As an example, the system may receive one or more cybersecurity documents from the external server through the transceiver. As an example, the system may transmit prediction results by the language model to any external device or the external server through the transceiver.

The system may access a network through the transceiver to transmit and receive various types of data. The transceiver may largely include a wired type and a wireless type. Since the wired type and the wireless type have their respective strengths and weaknesses, in some cases, the wired type and the wireless type may be simultaneously provided in the system. Here, in the case of the wireless type, a wireless local area network (WLAN)-based communication method such as Wi-Fi may be mainly used. Alternatively, in the case of the wireless type, cellular communication, for example, a long term evolution (LTE) and 5G-based communication method may be used. However, the wireless communication protocol is not limited to the above-described example, and any suitable wireless type communication method may be used. In the case of the wired type, local area network (LAN) or universal serial bus (USB) communication is a representative example, and other methods are also possible.

The memory may store various types of information. Various types of data may be temporarily or semi-permanently stored in the memory. An example of the memory may include a hard disk drive (HDD), a solid state drive (SSD), a flash memory, a read-only memory (ROM), a random access memory (RAM), or the like. The memory may be provided in a form embedded in the system or in a detachable form. The memory may store various types of data necessary for the operation of the system in addition to an operating system (OS) for driving the system or a program for operating each component of the system.

The processor may control a general operation of the system. Specifically, the processor may load and execute a program for the overall operation of the system from the memory. The processor may be implemented as an application processor (AP), a central processing unit (CPU), a microcontroller unit (MCU), or similar devices thereto according to hardware, software, or a combination thereof. In this case, the processor may be provided in an electronic circuit form processing an electrical signal to perform a control function in terms of hardware, and may be provided in a program or code form driving the hardware circuit in terms of software.

Figure 1B:
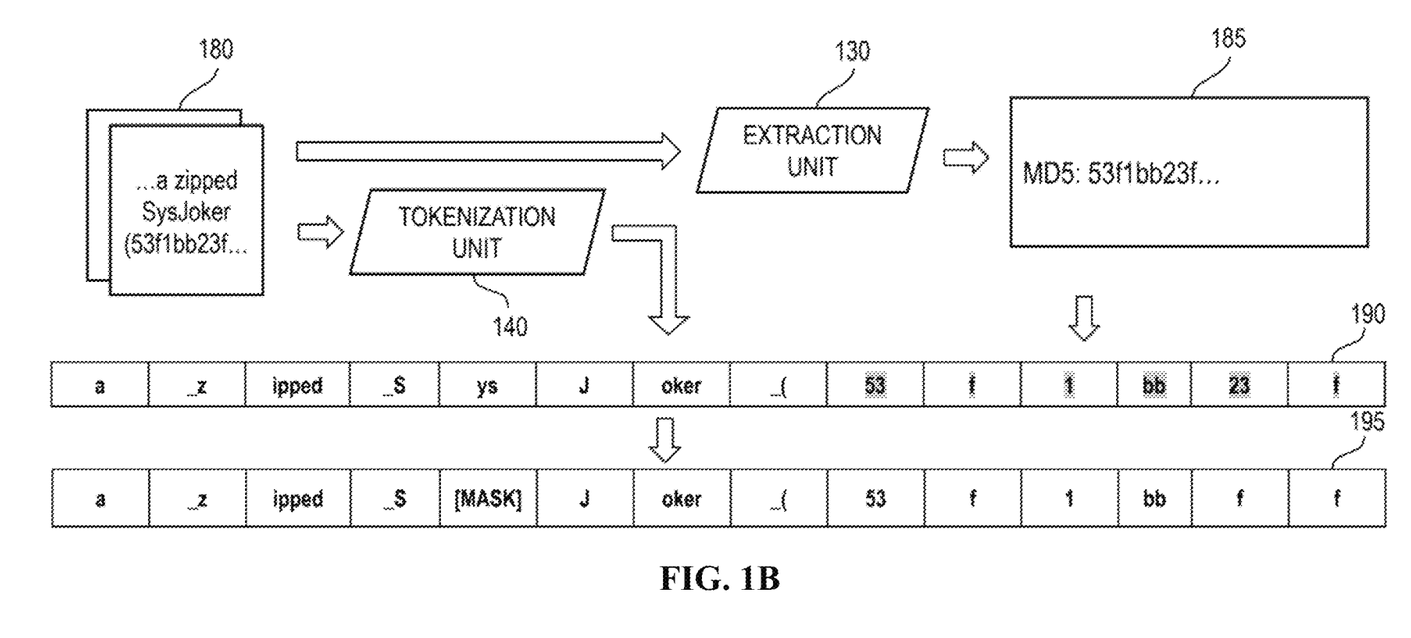
FIG. 1B is a diagram for describing a process of generating input data for a language model in a system for training a language model for cybersecurity according to an embodiment of the present disclosure.

FIG. 1B is a diagram for describing a process of generating input data for a language model in a system for training a language model for cybersecurity according to an embodiment of the present disclosure.

In the example shown in FIG. 1B, a cybersecurity document 180 to be used for training a language model may be collected. In this case, a plurality of strings constituting the document include linguistic elements and non-linguistic elements.

The tokenization unit 140 divides the text of the cybersecurity document into small units and generates tokens 190. In this case, tokens corresponding to non-linguistic elements 185 may be marked by the extraction unit 130.

Afterward, the masking unit 160 may randomly mask the tokens to generate masking tokens 195. In this case, the masking unit 160 according to the embodiment of the present disclosure may mask the tokens excluding tokens corresponding to non-linguistic elements. In the example shown in FIG. 1B, the masking tokens 195 may be input data of the training language model.

Figure 2:
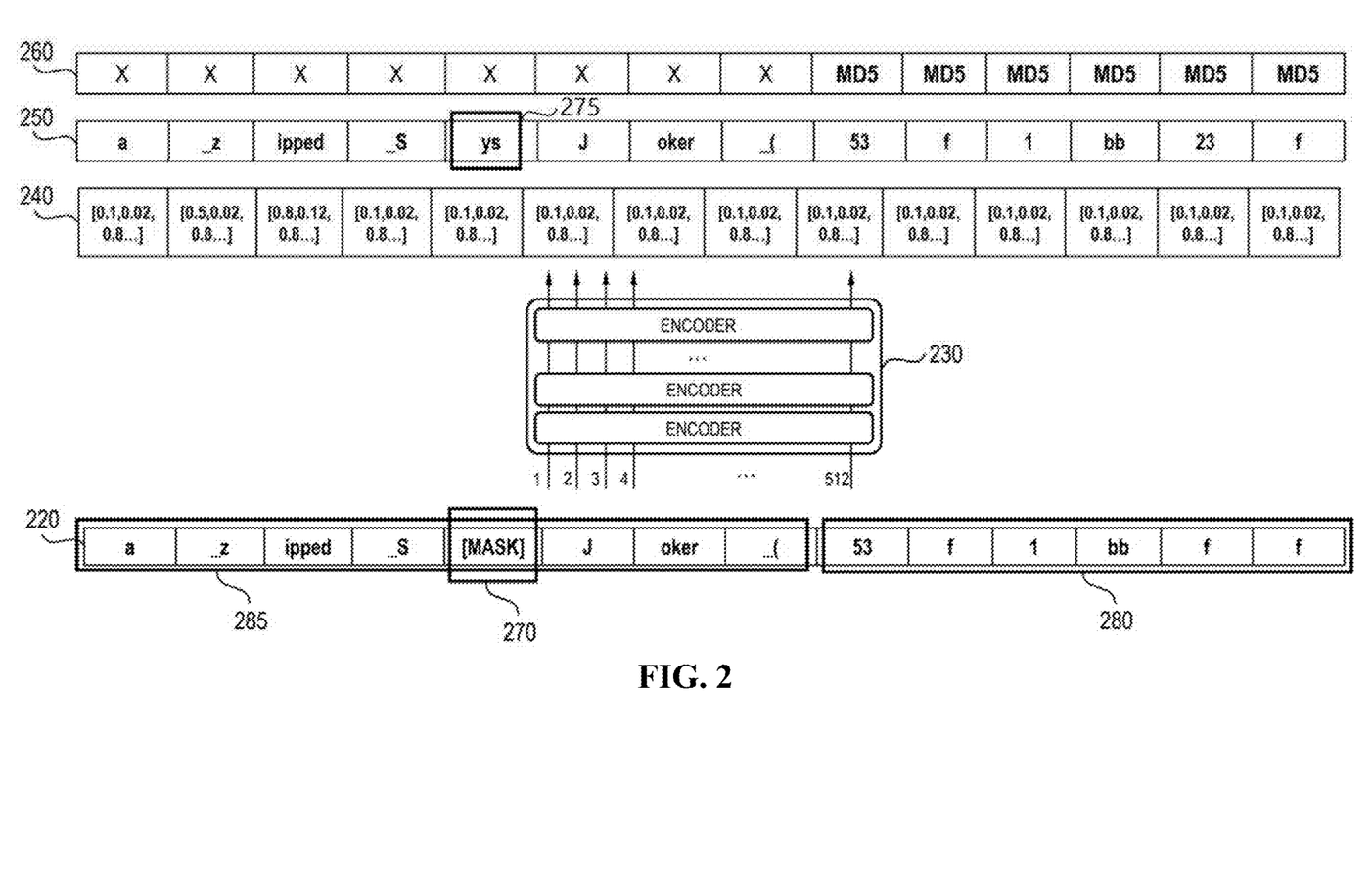
FIGS. 2 to 7 are exemplary diagrams for describing a process of training a language model for cybersecurity according to an embodiment of the present disclosure.

FIG. 2 is an exemplary diagram for describing a process of training a language model for cybersecurity according to an embodiment of the present disclosure.

In the example shown in FIG. 2, a text sequence, as denoted by a reference numeral 220, may be input to a language model 230 in the form of masking tokens. As described above with reference to FIG. 1B, data input to the language model 230 may be a text sequence in which only tokens corresponding to linguistic elements 285 are randomly masked as denoted by a reference numeral 270, excluding tokens corresponding to non-linguistic elements 280.

The language model 230 may extract features of the input data and generate a vector as denoted by a reference numeral 240. In general, the language model 230 may divide text into words or n-grams (groups of consecutive words) to represent text data as numbers and map each word or n-gram to a numeric vector. For such vector representation, techniques such as word embeddings or term frequency-inverse document frequency (TF-IDF) may be used, and the vector representation method is not limited in the present disclosure.

Afterward, the language model 230 may be trained to predict tokens at masked positions while classifying the types of tokens.

That is, according to an embodiment of the present disclosure, the training target model may be trained to simultaneously perform two tasks: first, predicting an original token for one input 220 to output a result 250, and second, predicting the types of tokens to output a result 260.

More specifically, the language model 230 may be trained to predict a token 270 at a masked position in the input data as a result 275. In this case, the model may be updated such that the difference between the predicted value and the actual value is minimized to the loss function.

Furthermore, the language model 230 may be trained to classify the entire sequence including the non-linguistic element 280 in the input data into a result 260. In the example shown in FIG. 2, the language model 230 may classify a non-linguistic element 280 in the input data as MD5, and a linguistic element 285 as F or with no classification value (see X in FIG. 2). In this case, the language model 230 may predict the type of the token by referring to the data on the non-linguistic elements and the identification code data that classify the types of the non-linguistic element in the non-linguistic element database 120.

In the system according to an embodiment of the present disclosure, since the language model 230 learns the sequence of the cybersecurity document in which non-linguistic elements are excluded in the masking, the performance of identifying the interaction and/or semantic similarity of linguistic elements included in the cybersecurity document may be improved. Furthermore, compared to the case in which the entire sequence including non-linguistic elements is learned, the performance of understanding the context of the cybersecurity document and/or the performance of identifying the correlation between the cybersecurity documents and core content may be improved.

FIGS. 3 to 7 are exemplary diagrams for describing a process of training a language model for cybersecurity according to an embodiment of the present disclosure.

Figure 3:
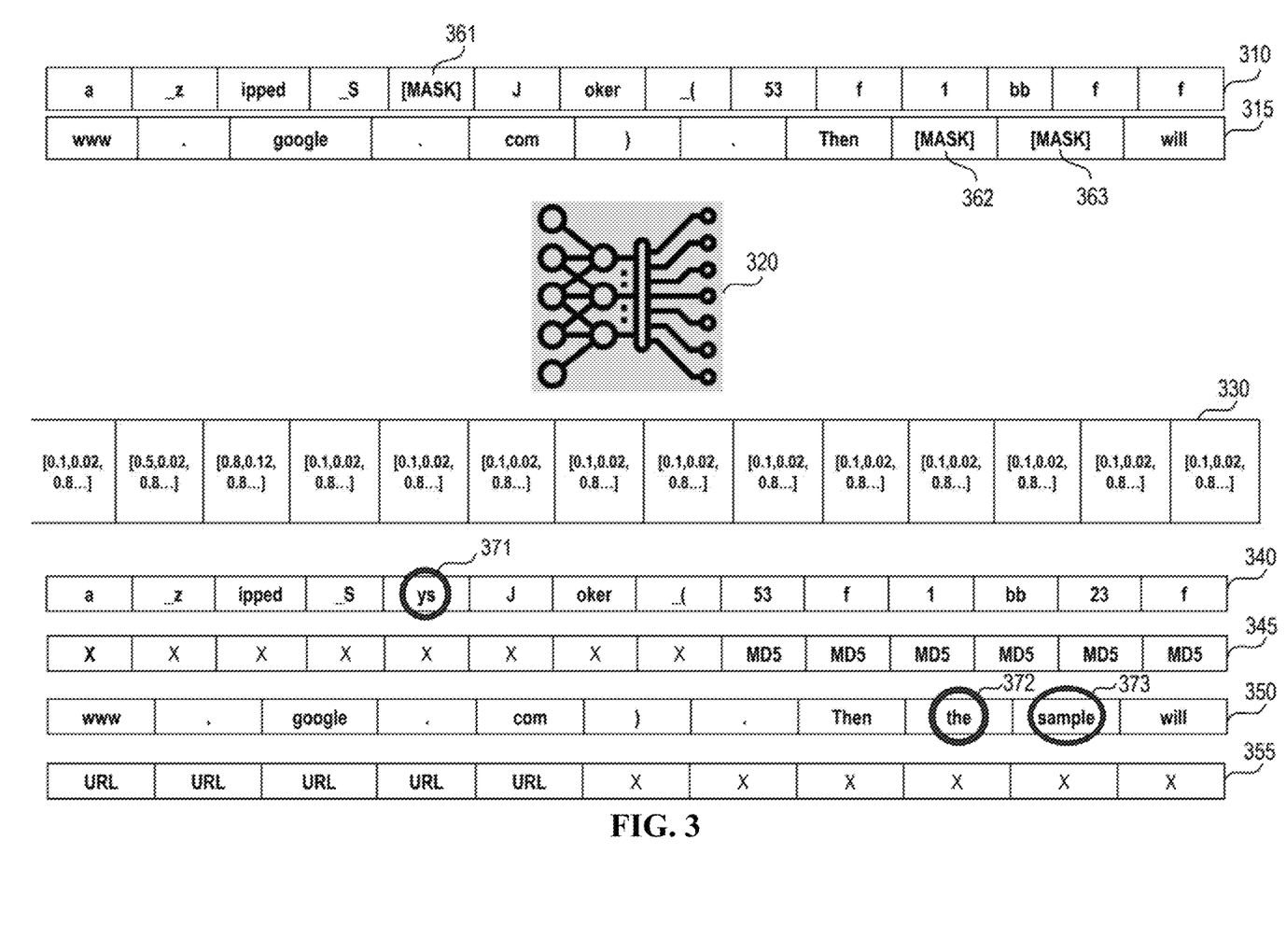

FIG. 3 is an exemplary diagram for describing a process for training a language model by inputting a cybersecurity document into the language model with only tokens for linguistic elements masked.

In the example shown in FIG. 3, a cybersecurity document may be input into a language model as input data 310 and 315 with only tokens for linguistic elements masked, excluding tokens corresponding to non-linguistic elements (an MD5 hash value in the example of the input data 310 and a URL in the example of the input data 315).

Afterward, the language model 320 may extract the features of the input data and generate a vector 330.

Afterward, the language model 320 may be trained to predict the tokens at the masked positions of the input sequence while classifying the types of tokens by referring to the input data vector 330.

More specifically, the language model 320 may be trained to predict tokens 361, 362, and 363 at the masked positions in the input data as results 371, 372, and 373. In this case, the language model 320 may be updated such that the difference between the predicted value and the actual value is minimized using the loss function.

Furthermore, the language model 320 may be trained to classify the entire sequence including non-linguistic elements in the input data into results 345 and 355. In the example shown in FIG. 3, the language model 320 may classify a non-linguistic element as MD5 and a linguistic element with no classification value in the result 345 for the first input data 310. In the result 355 for the second input data 315, the language model 320 may classify non-linguistic elements as a URL and linguistic elements with no classification value. In this case, the language model 320 may predict the types of tokens by referring to the data on the non-linguistic elements and the identification code data that classify the types of the non-linguistic elements of the non-linguistic element database 120.

Figure 4:
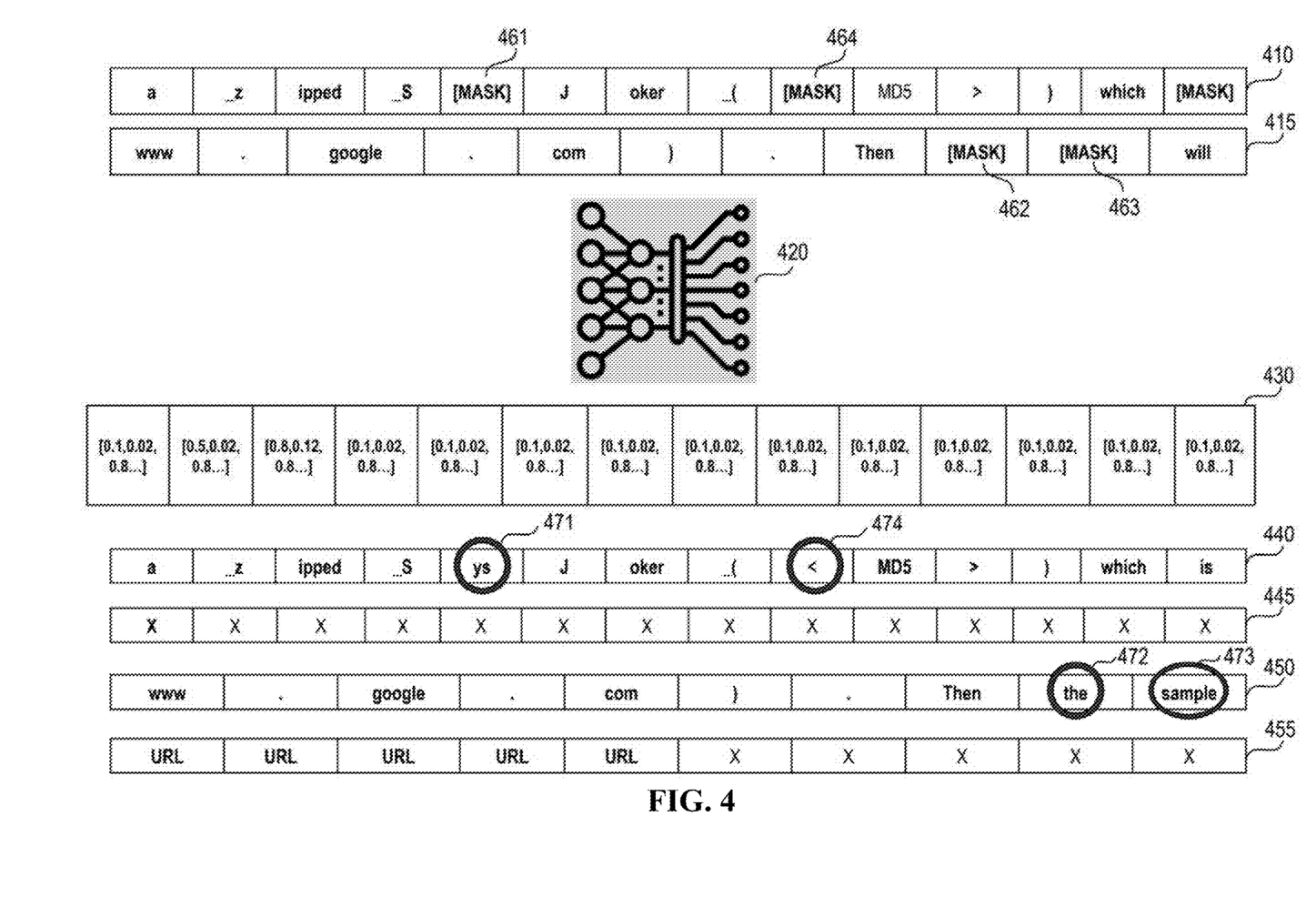

FIG. 4 is an exemplary diagram for describing a process of training a language model by replacing completely non-linguistic elements with identification codes in a cybersecurity document, and tokenizing the cybersecurity document, and then inputting the input data with only linguistic elements tokenized into the language model.

In the example shown in FIG. 4, the cybersecurity document may be input while completely non-linguistic elements are replaced with identification codes and only tokens for linguistic elements are masked.

For example, when the text sequence of the cybersecurity document is "The Dropper drops a zipped SysJoker (53f1bb23f670d331c9041748e7e8e396)," "53f1bb23f670d331c9041748e7e8e396" corresponds to an MD5 hash value, which is a completely non-linguistic element. According to the present embodiment, a completely non-linguistic element may be replaced with a preset identification code and tokenized. Since the text sequence in which the non-linguistic elements are replaced with the identification codes includes entirely linguistic elements, all tokens may be randomly masked and input to a language model 420 in the form of input data 410.

Meanwhile, as another example, when the text sequence of the cybersecurity document is "Get the sample from the website <www.google.com>. Then the sample will be processed," "www.google.com" is a URL, which is a non-linguistic element, but corresponds to a paralinguistic element that is distinguished from a completely non-linguistic element such as an MD5 hash value. According to the present embodiment, only completely non-linguistic elements may be replaced with identification codes, and paralinguistic elements may be tokenized without being replaced. That is, in the above example, without "www-.google.com" being replaced, the entire sequence is tokenized. Afterward, except for the token corresponding to the linguistic element, that is, the token corresponding to "www.google.com," only the remaining tokens are randomly masked and may be input to the language model 420 in the form of input data 415.

Afterward, the language model 420 may extract the features of the input data and generate a vector 430.

Afterward, the language model 420 may be trained to predict the tokens at the masked positions of the input sequence while classifying the types of the tokens by referring to the input data vector 430.

More specifically, the language model 420 may be trained to predict tokens 461, 462, 463, and 464 at masked positions in the input data as results 471, 472, 473, and 474. In this case, the language model 420 may be updated such that the difference between the predicted value and the actual value is minimized using the loss function.

Furthermore, the language model 420 may be trained to classify the entire sequence including non-linguistic elements in the input data into results 445 and 455. In this case, the model may predict the types of tokens by referring to the data on non-linguistic elements and the identification code data that classify the types of the elements in the non-linguistic element database 120.

In the example shown in FIG. 4, the input data 410 includes only linguistic elements, with non-linguistic elements replaced with identification codes referred to as MD5. Since the language model 420 according to the embodiment of the present disclosure classifies the linguistic elements with no classification value, all tokens will be classified with no classification value, as denoted by a reference numeral 445. Furthermore, for the input data 415, the language model 420 may classify the non-linguistic elements as a URL and the linguistic elements with no classification value and output a result 473.

Figure 5:
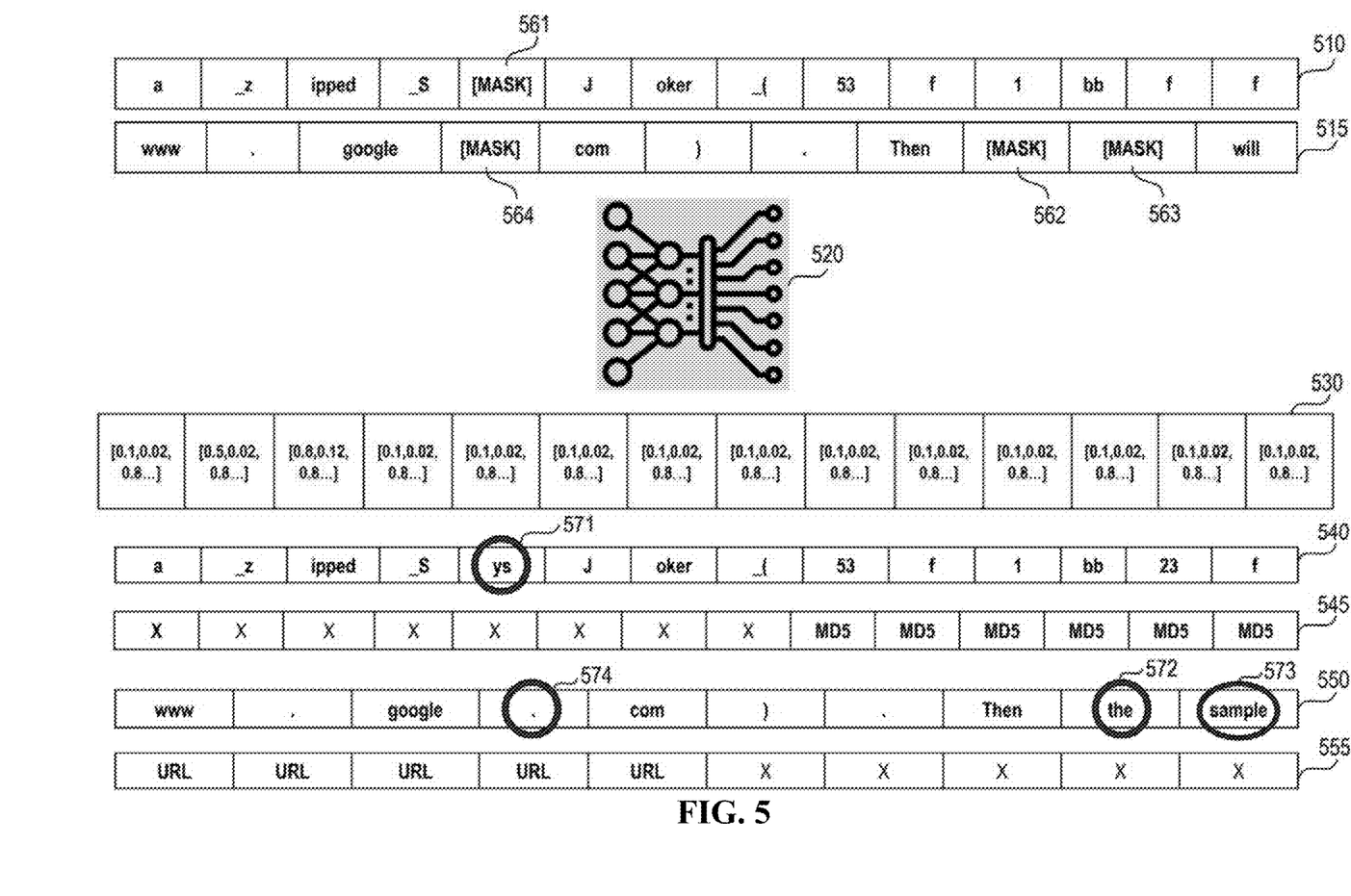

FIG. 5 is an exemplary diagram for describing a process of training a language model by inputting a cybersecurity document into a language model while only paralinguistic elements are masked along with linguistic elements.

In the example shown in FIG. 5, the cybersecurity document may be tokenized without replacement and may be input into a language model 520 with tokens for paralinguistic elements and linguistic elements masked, excluding tokens for non-linguistic elements. For example, input data 510 is randomly masked by excluding an MD5 hash value, which is a completely non-linguistic element, and input data 515 is randomly masked by including a URL, which is a paralinguistic element, and the randomly masked tokens may be input into the language model 520.

Afterward, the language model 520 may extract features of the input data and generate a vector 530.

Afterward, the language model 520 may be trained to predict tokens at the masked positions of the input sequence while classifying the types of the tokens by referring to the input data vector 530.

More specifically, the language model may be trained to predict tokens 561, 562, and 563 at the masked positions in the input data as results 571 and 572, and 573. Furthermore, a reference numeral 564 is a masking token for a paralinguistic element, and for masking token 564, the language model 520 may predict the masking token as a result 574. In this case, the language 520 model may be updated such that the difference between the predicted value and the actual value is minimized using the loss function.

In particular, in the above embodiment, since the language model 520 learns linguistic elements and paralinguistic elements from which meaning is inferable, excluding completely non-linguistic elements in the cybersecurity document, the performance of inferring meaning of the entire context of the cybersecurity document may be improved by understanding the interaction of linguistic elements and paralinguistic elements from which meaning is inferable.

Furthermore, the language model 520 may be trained to classify the entire sequence including non-linguistic elements in the input data into results 545 and 555. In the example shown in FIG. 5, the language model 520 may classify a non-linguistic element as MD5 and classify a linguistic element with no classification value in the result 545 for the first input data 510. In the result 555 for the second input data 515, the language model 520 may classify the non-linguistic element as a URL and the linguistic element with no classification value. In this case, the language model 520 may predict the type of the token by referring to the data on non-linguistic elements and the identification code data that classify the types of the elements in the non-linguistic element database 120.

Figure 6:
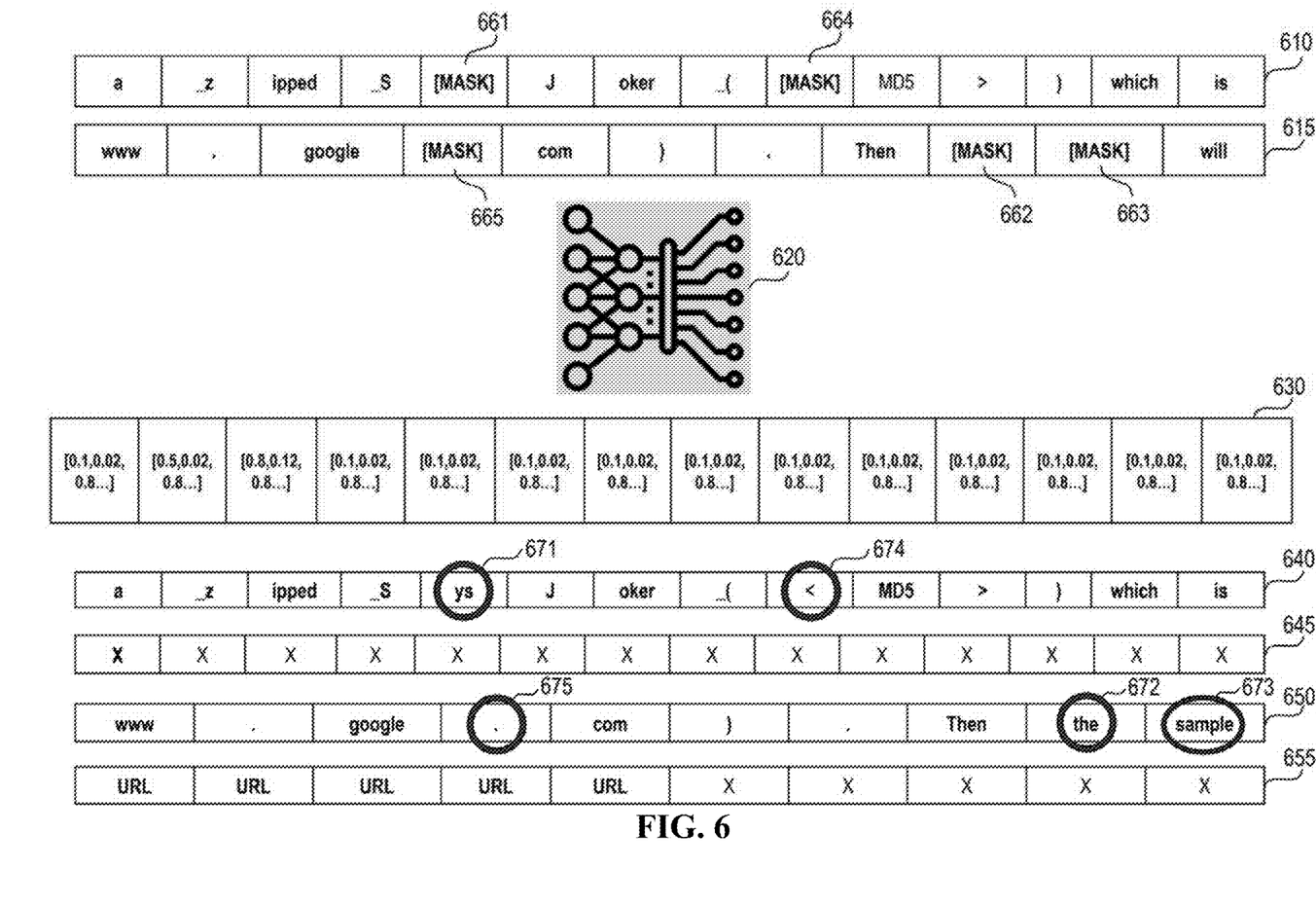

FIG. 6 is an exemplary diagram for describing a process of training a language model by replacing only completely non-linguistic elements in a cybersecurity document with identification codes, tokenizing the cybersecurity document, and then inputting input data with all tokens masked into the language model.

In the example shown in FIG. 6, the cybersecurity document may be input into the language model in a state in which completely non-linguistic elements are replaced with identification codes and all tokens are randomly masked.

For example, when the text sequence of the cybersecurity document is "The Dropper drops a zipped SysJoker (53f1bb23f670d331c9041748e7e8e396)," "53f1bb23f670d331c9041748e7e8e396" corresponds to an MD5 hash value, which is a completely non-linguistic element. According to the present embodiment, a completely non-linguistic element may be replaced with a preset identification code and tokenized. Afterward, all tokens may be randomly masked and input to a language model 620 in the form of input data 610.

Meanwhile, as another example, when the text sequence of the cybersecurity document is "Get the sample from the website <www.google.com>. Then the sample will be processed," "www.google.com" is a URL, which is a non-linguistic element, but corresponds to a paralinguistic element that is distinguished from a completely non-linguistic element such as an MD5 hash value. According to the embodiment, only completely non-linguistic elements may be replaced with identification codes, and paralinguistic elements may not be replaced and then may be tokenized. That is, in the above example, without "www.google.com" being replaced, the entire sequence may be tokenized. Afterward, all tokens may be randomly masked and input into the language model 620 in the form of input data 615.

Afterward, the language model 620 may extract the features of the input data and generate a vector 630.

Afterward, the language model 620 may be trained to predict the tokens at the masked position of the input sequence while classifying the types of the tokens by referring to the input data vector 630.

More specifically, the language model 620 may be trained to predict tokens 661, 662, 663, and 664 at masked positions in the input data as results 671, 672, 673, and 674. Furthermore, a reference numeral 664 is a masking token for a paralinguistic element, and the language model 620 may predict the token 664 as a result 674. In this case, the language model 620 may be updated such that the difference between the predicted value and the actual value is minimized using the loss function.

Furthermore, the language model 620 may be trained to classify the entire sequence including non-linguistic elements in the input data as results 645 and 655. In this case, the language model 620 may predict the types of tokens by referring to the data on non-linguistic elements and the identification code data that classify the types of the non-linguistic elements in the non-linguistic element database 120.

In the example shown in FIG. 6, the input data 610 includes only linguistic elements, with non-linguistic elements replaced by identification codes referred to as MD5. Since the language model 620 according to the embodiment of the present disclosure classifies linguistic elements with no classification value, all tokens will be classified with no classification value, as in a result 645. Furthermore, for the input data 615, the language model 620 may classify non-linguistic elements as a URL and linguistic elements with no classification value and output a result 655.

Figure 7:
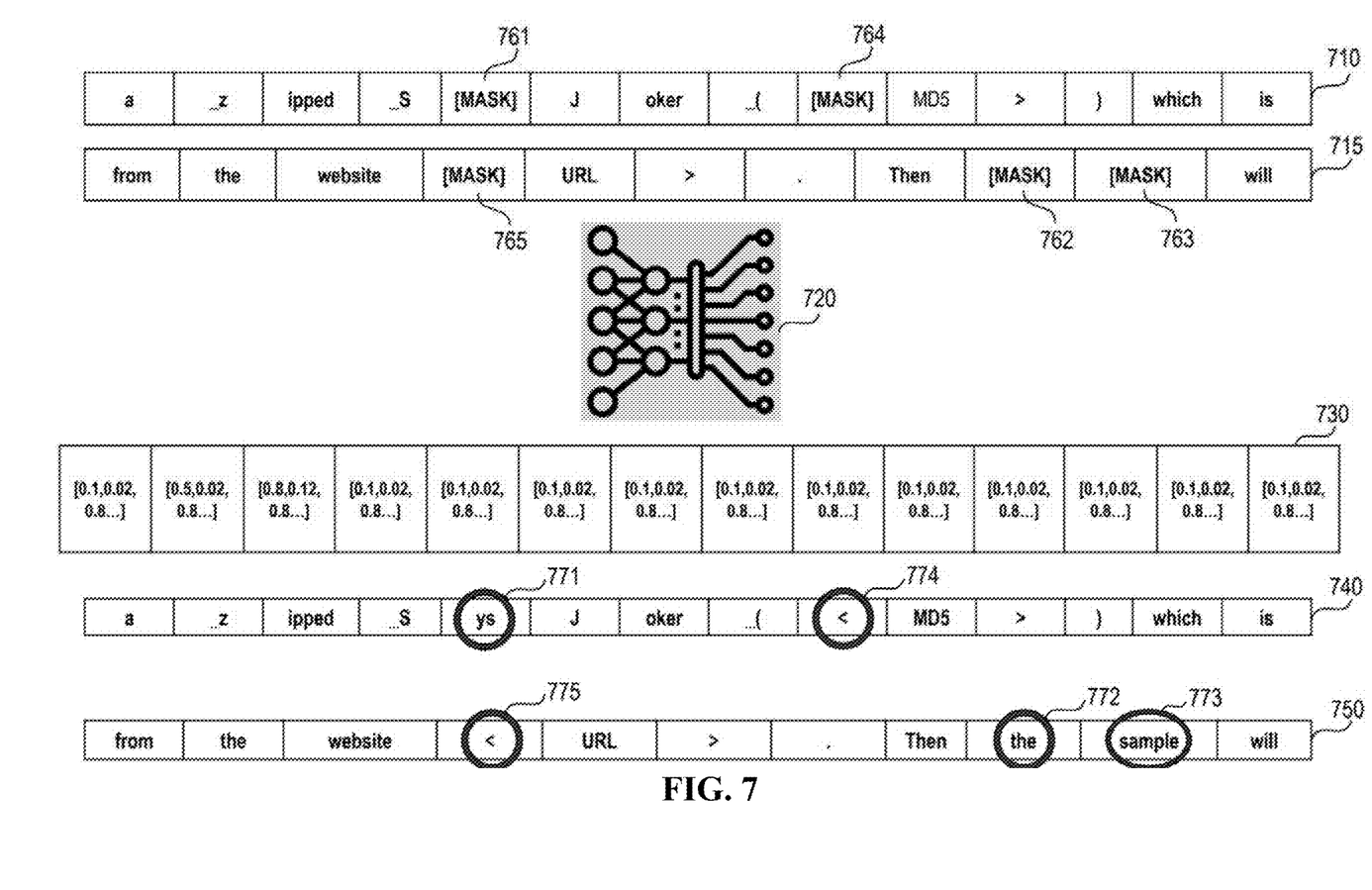

FIG. 7 is an exemplary diagram for describing a process of training a language model by replacing non-linguistic elements in a cybersecurity document with identification codes, tokenizing the cybersecurity document, and then inputting input data with all tokens masked into the language model.

In the example shown in FIG. 7, the cybersecurity document may be input into the language model with non-linguistic elements replaced with identification codes and all tokens randomly masked.

For example, when the text sequence of the cybersecurity document is "The Dropper drops a zipped SysJoker (53f1bb23f670d331c9041748e7e8e396)," "53f1bb23f670d331c9041748e7e8e396" corresponds to an MD5 hash value, which is a non-linguistic element. According to the present embodiment, a non-linguistic element may be replaced with a preset identification code and tokenized. Afterward, all tokens may be randomly masked and input to a language model 720 in the form of input data 710.

Meanwhile, as another example, when the text sequence of the cybersecurity document is "Get the sample from the website <www.google.com>. Then the sample will be processed," "www.google.com" is a URL, which is a non-linguistic element, but corresponds to a paralinguistic element that is distinguished from a completely non-linguistic element, such as an MD5 hash value. According to the embodiment, the paralinguistic element may also be replaced with a preset identification code and tokenized.

Afterward, all tokens may be randomly masked and input into the language model 720 in the form of input data 715.

Afterward, the language model 720 may extract the features of the input data and generate a vector 730.

Afterward, the language model 720 may be trained to predict the tokens at the masked positions of the input sequence by referring to the input data vector 730. More specifically, the language model 720 may be trained to predict tokens 761 to 765 at the masked positions in the input data as results 771 to 775. In this case, the language model 720 may be updated such that the difference between the predicted value and the actual value is minimized using the loss function.

Meanwhile, in the present embodiment, since all non-linguistic elements are replaced with preset identification codes and then tokenized, there are no non-linguistic elements in the input data. Therefore, there is no need to perform the task of classifying the types of tokens separately. This is because the language model 720 according to the embodiment of the present disclosure classifies linguistic elements as no classification value.

As is apparent from the above, the present disclosure is implemented to allow the language model to learn cybersecurity documents based on linguistic content, and thus the efficiency of training the language model can be enhanced.

In addition, the present disclosure is implemented to allow the language model to classify the types of non-linguistic elements included in the cybersecurity document, and thus even with appearance of non-linguistic elements in the cybersecurity documents, the meaning of the corresponding item can be identified, and the overall context can be effectively processed.

Effects of the present disclosure are not limited to those described above, and other effects which have not been described above will be clearly understood by those skilled in the technical field to which the present disclosure pertains from this specification and the accompanying drawings.

While the present disclosure has been described with reference to embodiments shown in the drawings to aid in the understanding of the present disclosure, this is merely illustrative, and it will be appreciated by those skilled in the art that various modifications and other equivalent embodiments are possible. Therefore, the true technical scope of protection of the present disclosure should be defined by the following claims.

What is claimed is:

1. A system for training a language model for cybersecurity, the system comprising:
a memory storing instructions; and
a processor configured to execute the instructions to:
collect a cybersecurity document used for training the language model for cybersecurity, wherein the cybersecurity document includes linguistic elements and non-linguistic elements, and the non-linguistic elements include completely non-linguistic elements that are arbitrary strings and have no linguistic meaning, and paralinguistic elements from which linguistic content can be inferred, and wherein the completely non-linguistic elements include at least one of a Bitcoin address, a hash value, an IP address, and a vulnerability identifier, and the paralinguistic elements include at least one of a uniform resource locator (URL) and an email address,
identify the non-linguistic elements in the cybersecurity document based on a non-linguistic element database,
tokenize the cybersecurity document to generate a plurality of tokens as input data for training the language model,
randomly mask the generated tokens excluding tokens corresponding to the completely non-linguistic elements,
input the entire sequence of the generated tokens including the randomly masked tokens into the language model as the input data,
extract, by the language model, features of the input data,
generate, by the language model, vectors corresponding to the features, and
train the language model to simultaneously perform a first task and a second task by referring to the vectors, wherein the first task is a task of classifying types of the tokens corresponding to the completely non-linguistic elements of the non-linguistic elements and tokens corresponding to the paralinguistic elements of the non-linguistic elements included in the cybersecurity document and the second task is a task of recovering only the tokens corresponding to the paralinguistic elements of the non-linguistic elements and tokens corresponding to the linguistic elements in the cybersecurity document.

2. The system of claim 1, wherein the processor is further configured to execute the instructions to:
replace the tokens corresponding to the completely non-linguistic elements of the non-linguistic elements in the cybersecurity document with preset codes; and
randomly mask the entire sequence of the generated tokens which includes the tokens replaced with preset codes.

3. A method of training a language model for cybersecurity, which is performed by a system for training the language model for cybersecurity, the method comprising:
collecting a cybersecurity document used for training the language model for cybersecurity, wherein the cybersecurity document includes linguistic elements and non-linguistic elements, and the non-linguistic elements include completely non-linguistic elements that are arbitrary strings and have no linguistic meaning, and paralinguistic elements from which linguistic content can be inferred, and wherein the completely non-linguistic elements include at least one of a Bitcoin address, a hash value, an IP address, and a vulnerability identifier, and the paralinguistic elements include at least one of a uniform resource locator (URL) and an email address;
identifying the non-linguistic elements in the cybersecurity document based on a non-linguistic element database;
tokenizing the cybersecurity document to generate a plurality of tokens as input data for training the language model;
randomly masking the generated tokens excluding tokens corresponding to the completely non-linguistic elements;
inputting the entire sequence of the generated tokens including the randomly masked tokens into the language model as the input data;
extracting, by the language model, features of the input data;
generating, by the language model, vectors corresponding to the features; and
training the language model to simultaneously perform a first task and a second task by referring to the vectors, wherein the first task is a task of classifying types of the tokens corresponding to the completely non-linguistic elements of the non-linguistic elements and tokens corresponding to the paralinguistic elements of the non-linguistic elements in the cybersecurity document and the second task is a task of recovering only the tokens corresponding to the paralinguistic elements of the non-linguistic elements and tokens corresponding to the linguistic elements in the cybersecurity document.

4. The method of claim 3, further comprising;
replacing the tokens corresponding to the completely non-linguistic elements of the non-linguistic elements in the cybersecurity document with preset codes; and
randomly masking the entire sequence of the generated tokens which includes the tokens replaced with the preset codes.

* * * * *